(12) United States Patent
Nakamura et al.

(10) Patent No.: US 10,988,001 B2
(45) Date of Patent: Apr. 27, 2021

(54) AIR CONDITIONING DEVICE FOR VEHICLE

(71) Applicant: Calsonic Kansei Corporation, Saitama (JP)

(72) Inventors: Takashi Nakamura, Saitama (JP); Tomohiro Maruyama, Saitama (JP); Shusuke Kawai, Saitama (JP)

(73) Assignee: MARELLI CABIN COMFORT JAPAN CORPORATION, Saitama (JP)

( * ) Notice: Subject to any disclaimer, the term of this patent is extended or adjusted under 35 U.S.C. 154(b) by 135 days.

(21) Appl. No.: 16/118,681

(22) Filed: Aug. 31, 2018

(65) Prior Publication Data

US 2019/0077229 A1    Mar. 14, 2019

(30) Foreign Application Priority Data

Sep. 13, 2017   (JP) .............................. JP2017-176201

(51) Int. Cl.
   *B60H 3/02*     (2006.01)
   *B60H 1/00*     (2006.01)

(52) U.S. Cl.
   CPC ......... *B60H 3/024* (2013.01); *B60H 1/00985* (2013.01); *B60H 2001/00214* (2013.01); *B60H 2003/028* (2013.01)

(58) Field of Classification Search
   CPC ............... B60H 3/024; B60H 1/00985; B60H 2003/028; B60H 2001/00214; B60H 1/00735; B60H 2001/3245; B60H 1/3207; B01D 53/04; B01D 53/02; F24F 3/147
   See application file for complete search history.

(56) References Cited

U.S. PATENT DOCUMENTS

| | | | | |
|---|---|---|---|---|
| 5,514,035 A | * | 5/1996 | Denniston | B64D 13/00 454/121 |
| 6,481,222 B1 | * | 11/2002 | Denniston | B64D 13/00 62/94 |
| 10,220,680 B2 | * | 3/2019 | Ito | F24F 3/14 |

FOREIGN PATENT DOCUMENTS

| | | | | |
|---|---|---|---|---|
| JP | 08-067136 A | | 3/1996 | |
| JP | 08067136 A | * | 3/1999 | |
| JP | 2001246931 A | * | 10/2001 | ............ F24F 3/1423 |
| JP | 2002-340370 A | | 11/2002 | |
| JP | 2006170518 A | * | 6/2006 | |

(Continued)

*Primary Examiner* — Frantz F Jules
*Assistant Examiner* — Martha Tadesse
(74) *Attorney, Agent, or Firm* — Global IP Counselors, LLP

(57) ABSTRACT

An air conditioning device for a vehicle includes a first flow path through which air subject to dehumidification flows, a second flow path through which air for recovery flows, a desiccant part and a controller. The desiccant part is fluidly communicated with the first and second flow paths, and configured to adsorb moisture contained in the air subject to dehumidification, and to discharge the moisture to the air for recovery. The controller is configured to control an air volume of the air subject to dehumidification and an air volume of the air for recovery so that the air volume of the air for recovery is less than the air volume of the air subject to dehumidification, after the air volume of the air for recovery reaches a prescribed air volume for achieving a target dehumidification amount of the air subject to dehumidification.

8 Claims, 8 Drawing Sheets

(56) References Cited

FOREIGN PATENT DOCUMENTS

| | | | | |
|---|---|---|---|---|
| JP | 2011185572 | A | * | 10/2011 |
| JP | 2013067320 | A | * | 4/2013 |
| JP | 2016101835 | A | * | 6/2016 |
| KR | 20060067796 | A | * | 6/2006 |
| WO | WO-2016147821 | A1 | * | 9/2016 ......... B60H 1/00849 |
| WO | WO-2019177121 | A1 | * | 9/2019 ............... B60H 3/00 |

* cited by examiner

US 10,988,001 B2

AIR CONDITIONING DEVICE FOR VEHICLE

CROSS-REFERENCE TO RELATED APPLICATIONS

This application claims priority to Japanese Patent Application No. 2017-176201, filed on Sep. 13, 2017. The entire disclosure of Japanese Patent Application No. 2017-176201 is hereby incorporated herein by reference.

BACKGROUND

Field of the Invention

The present invention relates to an air conditioning device for a vehicle.

Background Information

Disclosed in Japanese Laid-Open Patent Publication No. H08-067136 is an air conditioning device for a vehicle for which a moisture absorption device is placed on a flow path for air for air conditioning.

The moisture absorption device of this air conditioning device is configured by combining a moisture absorbing agent (desiccant material) and a regenerating heater. With this moisture absorption device, the moisture contained in the air that flows through the inside of the flow path is adsorbed by the moisture absorbing agent, which dehumidifies the air. Furthermore, when the moisture absorbing agent becomes saturated, by overheating the moisture absorbing agent using the regenerating heater and discharging the moisture contained in the moisture absorbing agent, the moisture absorbing agent is regenerated.

SUMMARY

However, with the air conditioning device of the above mentioned publication, when regenerating the moisture absorbing agent, it is not possible to perform dehumidification of the air, and thus, continuous dehumidification of air is not possible.

Here, it is conceivable to do the following in order to make continuous dehumidification of air possible.

(a) In one moisture absorbing agent (desiccant material or desiccant part), set an adsorption area for adsorbing moisture and a desorption area for desorbing the adsorbed moisture.

(b) For example, place the adsorption area of the desiccant material inside the flow path through which the air subject to dehumidification flows, and place the desorption area inside the flow path for air for recovery for desorbing and recovering moisture from the desiccant material.

In this case, by the moisture contained in the air being adsorbed in the adsorption area of the desiccant material and the air being dehumidified, while the moisture from the desorption area of the desiccant material is desorbed and incorporated in the air for recovery, it is possible to perform moisture adsorption and desorption continuously.

Here, when the air volume of the air subject to dehumidification increases, the moisture amount adsorbed by the desiccant material (dehumidification amount) also increases. For that reason, to increase the amount of moisture incorporated in the air for recovery from the desiccant material, typically the air volume of the air for recovery is increased following the increase in the air volume of the air subject to dehumidification.

However, in parallel with dehumidification of the air subject to dehumidification, the exchange of the heat quantity (sensible heat exchange) between the air subject to dehumidification and the air for recovery is performed via the desiccant material.

For that reason, when the air volume of the air for recovery is increased following the increase in the air volume of the air subject to dehumidification, the temperature change of the air subject to dehumidification due to the sensible heat exchange is large, so the temperature of the air subject to dehumidification diverges from the target temperature.

In light of that, there is demand for making it possible to suppress sensible heat transfer via the desiccant material between the air subject to dehumidification and the air for recovery.

An air conditioning device for a vehicle according to one aspect includes a first flow path through which air subject to dehumidification flows, a second flow path through which air for recovery flows, a desiccant part and a controller. The desiccant part is fluidly communicated with both the first flow path and the second flow path, and configured to adsorb moisture contained in the air subject to dehumidification to dehumidify the air subject to dehumidification, and to discharge the moisture to the air for recovery. The controller is configured to control an air volume of the air subject to dehumidification in the first flow path and an air volume of the air for recovery in the second flow path so that the air volume of the air for recovery is less than the air volume of the air subject to dehumidification, after the air volume of the air for recovery reaches a prescribed air volume for achieving a target dehumidification amount of the air subject to dehumidification.

With this aspect, it is possible to suppress sensible heat transfer via the desiccant part between the air subject to dehumidification and the air for recovery.

BRIEF DESCRIPTION OF THE DRAWINGS

Referring now to the attached drawings which form a part of this original disclosure.

DETAILED DESCRIPTION OF EMBODIMENTS

First Embodiment

Following, a first embodiment of the present invention is explained using an example of a case when the air subject to dehumidification is air for which the temperature is regulated (conditioned air) using a temperature regulating unit 10 of an air condition device 1.

Figure 1:
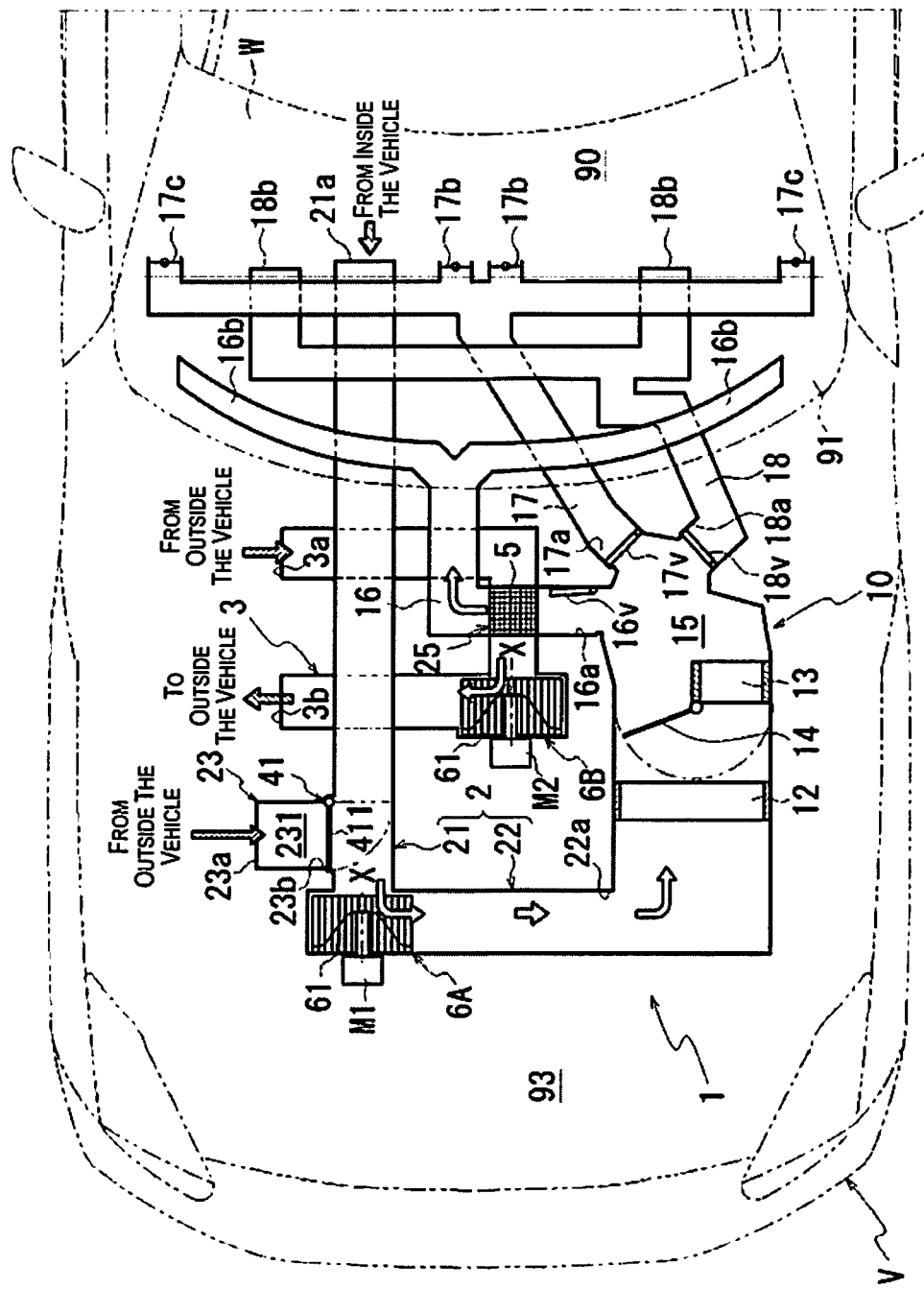
FIG. 1 is a schematic block diagram of an air conditioning device for a vehicle of a first embodiment.

FIG. 1 is a schematic block diagram of the air condition device for a vehicle 1 of the present embodiment.

Figure 2:
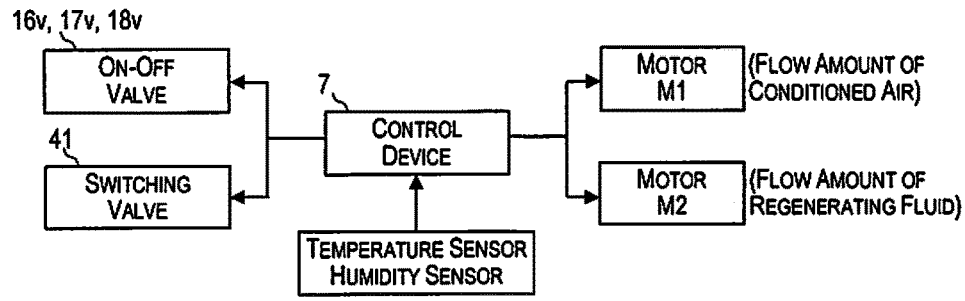
FIG. 2 is a drawing for explaining a control object of a control device of the air conditioning device for a vehicle.

FIG. 2 is a drawing for explaining the control object of a control device 7 provided in the air condition device for a vehicle 1. The control device 7 includes a computer that executes a predetermined control program and a memory that stores information used for various control programs and various control processes. The computer includes, for example, a central processing unit (CPU) or a micro-processing unit (MPU).

As shown in FIG. 1, the air conditioning device for a vehicle 1 has the temperature regulating unit 10 for regulating conditioned air (air for which the temperature has been regulated) supplied to inside a vehicle interior 90.

The temperature regulating unit 10 has an evaporator 12, a heater core 13, a mix door 14, and a mixing unit 15.

The evaporator 12 cools the air blown from a sirocco fan 6A side.

The heater core 13 and the mix door 14 are provided at the downstream side of the evaporator 12. The mix door 14 regulates the amount of air cooled by the evaporator 12 that flows into the heater core 13 side, and the heater core 13 heats up the air that flowed in from the evaporator 12 side.

With this air conditioning device 1, the air cooled by the evaporator 12 and the air heated up via the heater core 13 are mixed inside the mixing unit 15, and conditioned air of a designated temperature is regulated.

Adjustment of the temperature of the conditioned air is performed by the amount of air that flows in to the heater core 13 side being regulated by the mix door 14.

In the mixing unit 15, supply ports (defroster side supply port 16a, vent side supply port 17a, and foot side supply port 18a) open to ducts (defroster duct 16, vent duct 17, foot duct 18).

Provided at the supply ports (defroster side supply port 16a, vent side supply port 17a, and foot side supply port 18a) are on-off valves 16v, 17v, and 18v. Opening and closing of the on-off valves 16v, 17v, and 18v is performed by the control device 7 (see FIG. 2).

For that reason, the conditioned air for which the temperature was regulated by the mixing unit 15 passes through at least one duct among the ducts (defroster duct 16, vent duct 17, and foot duct 18), and finally is supplied to inside the vehicle interior 90.

The defroster duct 16 connects a blowout port 16b that opens near the bottom part of a windshield glass W, and the defroster side supply port 16a.

The blowout port 16b has a designated length in the vehicle width direction to make it so that the conditioned air blown out from this blowout port 16b contacts approximately the entire surface of the vehicle width direction of the windshield glass W.

The vent duct 17 connects blowout ports 17b, 17c that open at an instrument panel 91 inside the vehicle interior 90 with the vent side supply port 17a.

The foot duct 18 connects a blowout port 18b that opens near the floor of the vehicle interior 90 with the foot side supply port 18a.

The air conditioning device 1 has a first flow path 2 through which flows at least one of the air taken in from an intake port 21a for air inside the vehicle interior 90 (vehicle interior) and an intake port 23a for air outside of the vehicle.

Here, in the explanation hereafter, the air inside the vehicle interior 90 taken in from the intake port 21a is noted as "internal air," and air from outside the vehicle taken in from the intake port 23a or from an intake port 3a described later is noted as "external air."

The first flow path 2 has a flow passage 21 and a forced air path 22. The flow passage 21 has the intake port 21a for air inside the vehicle interior 90 at one end in the lengthwise direction. The forced air path 22 has the temperature regulating unit 10 and a connection port 22a at one end in the lengthwise direction.

A rotor 61 of the sirocco fan 6A is provided on the interior of the forced air path 22. The rotor 61 rotates integrally around axis line X by the rotation driving force of a motor M1. The driving of the motor M1 is controlled by the control device 7 (see FIG. 2).

With the sirocco fan 6A, when the rotor 61 rotates around the axis line X, air is suctioned from the rotation axis (axis line X) direction of the rotor 61, and also, the suctioned air is sent out in the radial direction of the axis line X.

For that reason, with the first flow path 2, in the area of the forced air path 22 in which the rotor 61 is provided, the flow passage 21 is connected from the axis line X direction.

At the midway position in the lengthwise direction of the flow passage 21, an outside air introduction unit 23 having an intake port 23a for air outside the vehicle is connected. At the connection part of the outside air introduction unit 23 and the flow passage 21, provided is a switching valve 41 for opening and closing an opening 23b of the outside air introduction unit 23.

A partition wall 411 of the switching valve 41 is displaced between an inside air introduction position (see FIG. 1: solid line) and an outside air introduction position (see FIG. 1: virtual line). This displacement of the partition wall 411 and the placement of the partition wall 411 are controlled by the control device 7 (see FIG. 2).

When the partition wall 411 is placed at the inside air introduction position, the opening 23b of the outside air introduction unit 23 is closed by the partition wall 411, and communication between the flow passage 21 and the outside air introduction unit 23 is blocked.

As a result, the air inside the vehicle interior 90 (internal air) taken in to the inside of the flow passage 21 via the intake port 21a passes through the flow passage 21 and is supplied to inside the forced air path 22.

When the partition wall 411 is placed at the outside air introduction position (see FIG. 1: virtual line), the inflow of air from the intake port 21a to the flow passage 21 (internal air) is obstructed, and also, the inflow of air from the intake port 23a to the flow passage 21 (external air) is permitted.

As a result, the air outside the vehicle (external air) incorporated from the intake port 23a to the internal space 231 of the outside air introduction unit 23 is supplied through the flow passage 21 to inside the forced air path 22.

The partition wall 411 may also be placed between the inside air introduction position and the outside air introduction position. In this case, both the air inside the vehicle interior 90 (internal air) and the air outside the vehicle (external air) are supplied inside the forced air path 22.

The air (internal air and/or external air) supplied to inside the forced air path 22, after the temperature is regulated by the temperature regulating unit 10, passes through at least one duct among the defroster duct 16, the vent duct 17, and the foot duct 18, and is supplied as conditioned air to inside the vehicle interior 90.

With the defroster duct 16, in the area between the defroster side supply port 16a and the blowout port 16b, an intersection area 25 with a second flow path 3 is provided.

At the intersection area 25, the defroster duct 16 and the second flow path 3 are approximately orthogonal. One end and the other end in the lengthwise direction of the second flow path 3 are respectively the intake port 3a for external air and the exhaust port 3b for external air.

With the second flow path 3, the rotor 61 of a sirocco fan 6B is provided further to the downstream side than the intersection area 25 with the defroster duct 16. The rotor 61 rotates around the axis line X by the rotation driving force of a motor M2. The driving of the motor M2 is controlled by the control device 7 (see FIG. 2).

With the sirocco fan 6B, when the rotor 61 rotates around the axis line X, air is suctioned from the rotation axis (axis line X) direction of the rotor 61, and also, the suctioned air is sent out in the radial direction of the axis line X.

For that reason, when the rotor 61 rotates around the axis line X, the air outside the vehicle (external air) is incorporated inside the second flow path 3 from the intake port 3a.

Also, the air (external air) incorporated inside the second flow path 3 is exhausted to outside the vehicle from the exhaust port 3b after passing through the intersection area 25 with the defroster duct 16.

A desiccant part 5 is provided in the intersection area 25 of the second flow path 3 and the defroster duct 16.

The desiccant part 5 is provided to dehumidify the condition air that flows through the defroster duct 16.

Figure 3:
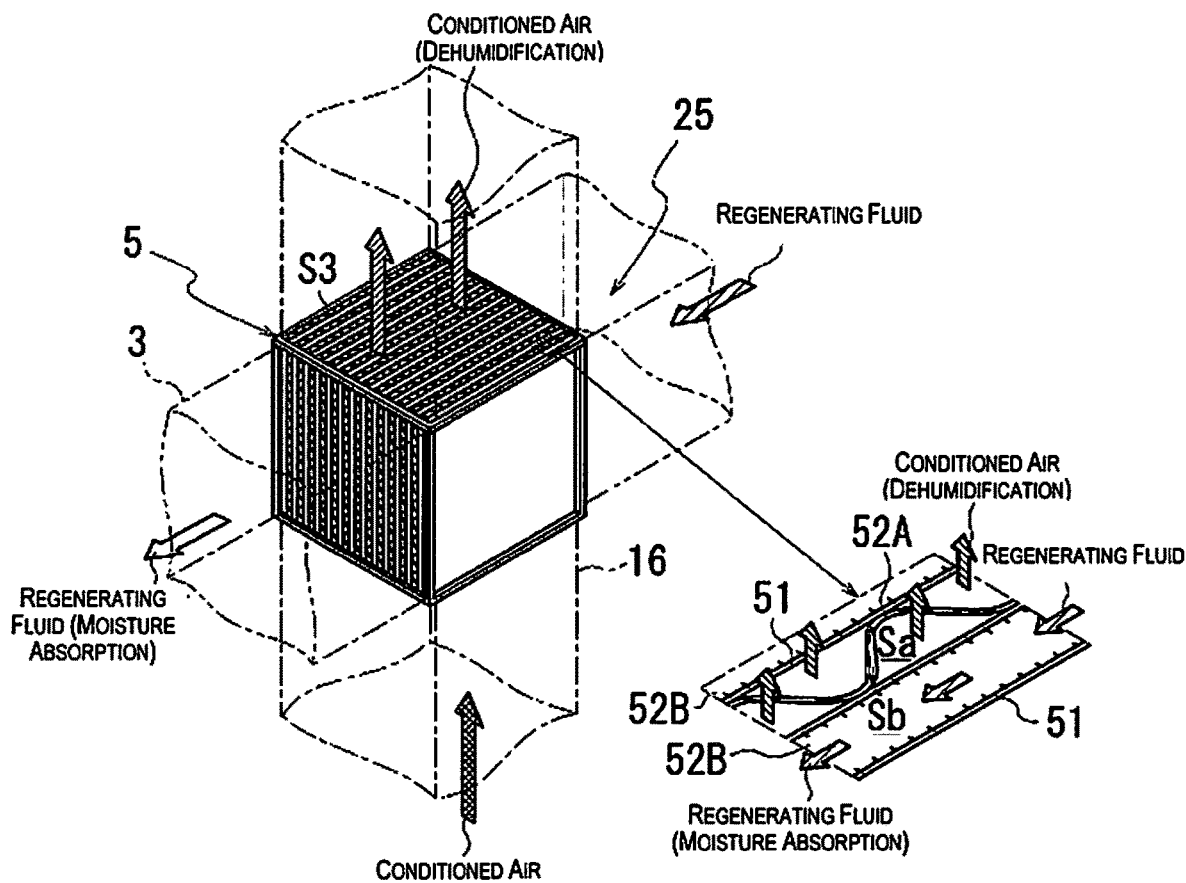
FIG. 3 is a drawing for explaining a desiccant part provided in an intersection area.

FIG. 3 is a drawing for explaining the desiccant part 5 provided in the intersection area 25.

Figure 4A:
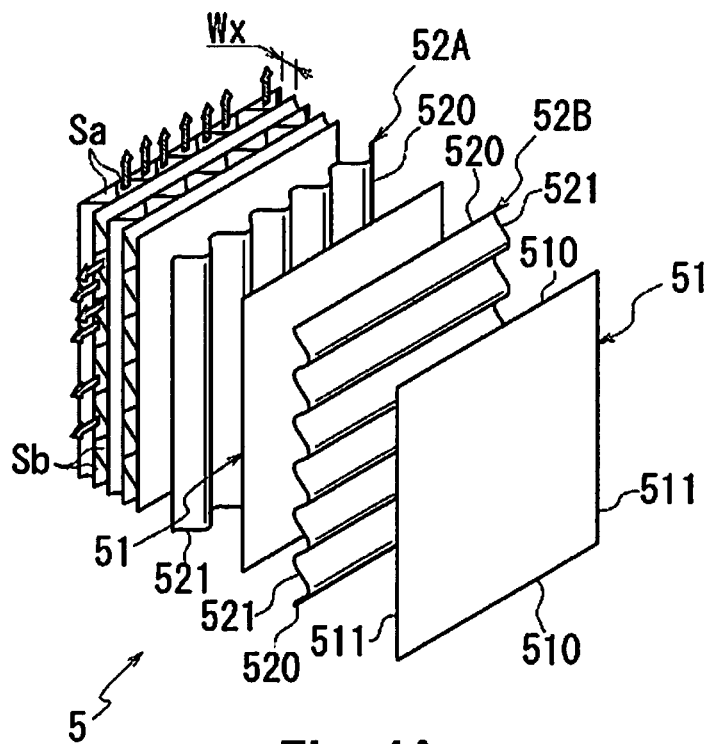
FIG. 4A is a perspective view showing an exploded view of a portion of the desiccant part.
Figure 4B:
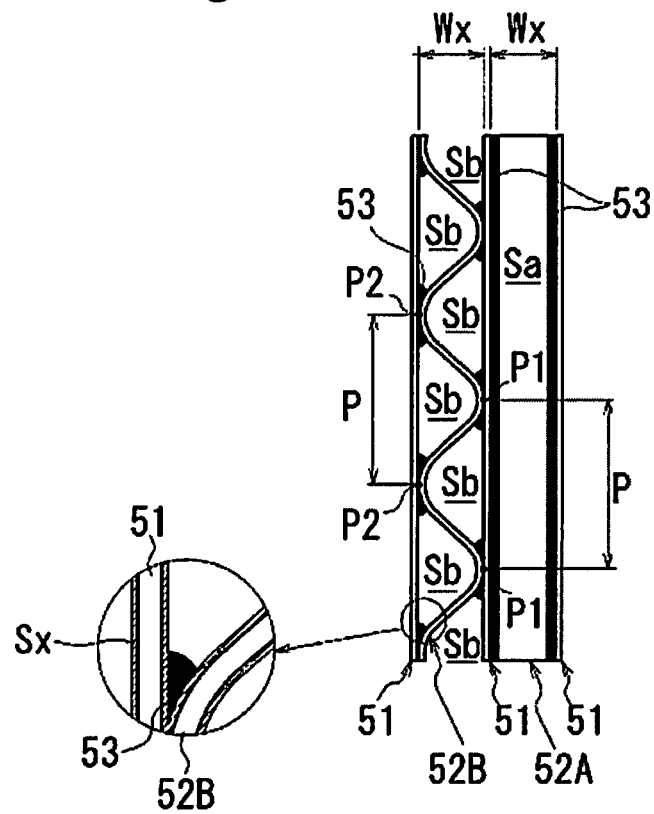
FIG. 4B is a plan view viewed from the flow direction of the air in an area of a portion of the desiccant part.

FIGS. 4A and 4B are drawings for explaining the configuration of the desiccant part 5. FIG. 4A is a perspective view showing an exploded view of a portion of the desiccant part 5. FIG. 4B is a plan view viewed from the flow direction of the air in an area of a portion of the desiccant part 5, and is a drawing for explaining the basic configuration of the desiccant part 5.

As shown in FIG. 3, in the intersection area 25 of the defroster duct 16 and the second flow path 3, the movement direction of the air flowing through the defroster duct 16 and the movement direction of the air flowing through the second flow path 3 are orthogonal.

As shown in FIGS. 4A and 4B, the desiccant part 5 has a plurality of plate-shaped bases 51 placed approximately parallel to each other with an interval open, and a wave-shaped base member 52 placed between the plate-shaped bases 51, 51.

The wave-shaped base member 52 is provided between a pair of adjacent plate-shaped bases 51, 51 in the alignment direction of the plate-shaped bases 51.

The plate-shaped base member 51 is a plate shaped member forming a rectangular shape in the front view. Of the four sides of the plate-shaped base member 51, two opposing sides 510, 510 and the remaining two opposing sides 511, 511 form respectively straight line shapes in the side view. The two opposing sides 510, 510 and the two opposing sides 511, 511 are orthogonal to each other in the front view.

The wave-shaped base member 52 is a plate shaped member forming a rectangular shape in the front view. Of the four sides of the wave-shaped base member 52, two opposing sides 520, 520 form a straight line shape in the side view, and the remaining two sides 521, 521 form a wave shape in the side view.

The wave-shaped base member 52 is provided alternately in contact with the plate-shaped base member 51 positioned at one side and the plate-shaped base member 51 positioned at the other side sandwiching that wave-shaped base member 52.

Contact points P1, P2 of the wave-shaped base member 52 with the plate-shaped bases 51 are connected by an adhesive agent 53.

An interval P of contact points P1, P1 of the wave-shaped base member 52 with the plate-shaped base member 51 positioned at one side of this wave-shaped base member 52, and the interval P of the contact points P2, P2 of the wave-shaped base member 52 with the plate-shaped base member 51 positioned at the other side of this wave-shaped base member 52 have approximately the same pitch.

With the desiccant part 5, the plate-shaped base member 51 and the wave-shaped base member 52 are placed alternately. Adjacent wave-shaped bases 52A, 52B in the alignment direction of the plate-shaped bases 51 are provided with the orientation differing by 90 degrees each.

Between the pair of plate-shaped bases 51, 51, a plurality of spaces Sa, Sb enclosed by the wave-shaped bases 52A, 52B and the pair of plate-shaped bases 51, 51 are formed with roughly the same opening cross section area.

Also, the space Sa formed between the wave-shaped base member 52A and the plate-shaped bases 51, 51 positioned at both sides of this wave-shaped base member 52A, and the space Sb formed between the wave-shaped base member 52B and the plate-shaped bases 51, 51 positioned at both sides of this wave-shaped base member 52B are orthogonal.

With the desiccant part 5 of the present embodiment, conditioned air (air subject to dehumidification) flows through the space Sa formed by the wave-shaped base member 52A, and regenerating fluid (air for recovery) flows through the space Sb formed by the wave-shaped base member 52B.

In the explanation hereafter, for convenience of explanation, spaces Sa, Sb are respectively noted also as flow paths Sa, Sb. Furthermore, when not specifically differentiating, the spaces Sa, Sb (flow paths Sa, Sb) are simply noted as space S (flow path S). For wave-shaped bases 52A, 52B as well, when not specifically differentiating, this is noted simply as wave-shaped base member 52.

With the desiccant part 5, the wave-shaped base member 52A (first wave-shaped base member) forming the flow path Sa for conditioned air, and the wave-shaped base member 52B (second wave-shaped base member) forming the flow path Sb for regenerating fluid are alternately provided in the alignment direction of the plate-shaped bases 51.

With the present embodiment, the plate-shaped bases 51 and the wave-shaped base member 52 (52A, 52B) configuring the desiccant part 5 are formed by a nonwoven fabric or paper capable of moisture adsorption and desorption.

Here, in anticipation of an improvement in the efficiency of adsorption and desorption, it is preferable to have supported in the plate-shaped bases 51 and the wave-shaped base member 52 a material capable of adsorbing and desorbing moisture such as a polymer type adsorbent Sx or an inorganic type adsorbent.

With the desiccant part 5 shown in FIG. 4, the surface of the plate-shaped bases 51 and the wave-shaped base member 52 (52A, 52B) is covered by a layer of the adsorbent Sx.

Also, with the contact points P1, P2 of the wave-shaped base member 52 (52A, 52B) and the plate-shaped bases 51, the plate shaped bases 51 and the wave-shaped base member 52 (52A, 52B) for which the surface is covered by the adsorbent Sx are connected without gaps by the adhesive agent 53 (see FIG. 4B).

Here, the term "adsorbent" in this specification means an organic type polymer material or inorganic material having the characteristic of holding (adsorbing) moisture including not only materials that adsorb moisture (typical adsorbent) on the surface thereof but also materials that store moisture inside the material.

Also, in the adsorbent, the moisture is held in a state that can move between the adsorbents held in the base material, and move between the adsorbents and the base material.

Explained is the operation of the air conditioning device 1 having this configuration.

In a vehicle V (see FIG. 1), when doing air conditioning inside the vehicle interior 90 without incorporating external air, the air conditioning device 1 circulates the air (internal air) taken in from inside the vehicle interior 90 inside the vehicle interior 90 after regulating the temperature.

For that reason, the absolute humidity of the circulated air (conditioned air) rises over time according to the condition within the vehicle interior 90, etc.

Here, when conditioned air for which the absolute humidity is high is circulated inside the vehicle interior 90, fog may occur on the windshield glass W, etc.

For that reason, the air conditioning device 1 has as one operating mode a desiccant mode for dehumidifying the air taken in from inside the vehicle interior 90.

Hereafter, explained is a case when the operating mode of the air conditioning device 1 is the desiccant mode.

Here, with the desiccant mode, the moisture contained in the conditioned air is adsorbed by the desiccant part 5, dehumidifying the conditioned air, whereas by the air (regenerating fluid) taken in from outside the vehicle, the moisture is desorbed from the desiccant part 5. As a result, it is possible to continuously perform adsorption of moisture in the desiccant part 5.

Desiccant Mode

In the desiccant mode, the control device 7 operates the switching valve 41, and the partition wall 411 is placed in the inside air introduction position (see FIG. 1: solid line).

As a result, communication between the flow passage 21 of the first flow path 2 and the outside air introduction unit 23 is blocked, and the interior of the flow passage 21 is in a state for which only the air (internal air) taken in from the intake port 21a can flow through.

In this state, the control device 7 drives the motor M1, and rotates the rotor 61 of the sirocco fan 6A around the axis line X. As a result, inside the flow passage 21 positioned to the upstream side of the rotor 61, air (internal air) inside the vehicle interior 90 flows in from the intake port 21a.

Furthermore, the control device 7 drives the motor M2, rotating the rotor 61 of the sirocco fan 6B around the axis line X. As a result, the air outside the vehicle (regenerating fluid) flows into the inside of the second flow path 3, and inside the second flow path 3, a flow of air (regenerating fluid) is formed facing from the intake port 3a of one end in the lengthwise direction toward the exhaust port 3b of the other end.

The air outside the vehicle (regenerating fluid) that flows into the inside of the second flow path 3 from the intake port 3a passes through the intersection area 25 with the defroster duct 16, after which it is exhausted from the exhaust port 3b.

At the intersection area 25, the second flow path 3 and the defroster duct 16 intersect in a direction that is approximately orthogonal. Inside the intersection area 25, the desiccant part 5 is provided straddling to be fluidly communicated with both of the flow path of air (regenerating fluid) that flows through the second flow path 3 and the flow path of conditioned air that flows through the defroster duct 16.

As described previously, with the desiccant part 5, conditioned air for which the temperature is regulated by the temperature regulating unit 10 passes through the inside of the flow path Sa formed between the wave-shaped base member 52A and the plate-shaped base member 51.

The plate-shaped base member 51 and the wave-shaped base member 52 are formed by a material capable of moisture adsorption and desorption (nonwoven fabric, for example). Furthermore, at least an adsorbent Sx capable of moisture adsorption and desorption is supported on the surface of the plate-shaped bases 51 and the wave-shaped base member 52.

For that reason, when the conditioned air passes through the desiccant part 5, the moisture contained in the conditioned air is adsorbed by the plate-shaped bases 51, 51, the wave-shaped base member 52A, and the adsorbent Sx surrounding the flow path Sa.

As a result, the conditioned air for which the temperature is regulated by the temperature regulating unit 10 is dehumidified by the desiccant part 5.

Furthermore, with the desiccant part 5, the regenerating fluid taken in from outside the vehicle interior 90 (outside the vehicle) passes through the inside of the flow path Sb formed between the wave-shaped base member 52B and the plate-shaped base member 51.

With the desiccant mode, the air (regenerating fluid) taken in from outside the vehicle is air that at least has low absolute humidity. Also, with this embodiment, in the desiccant mode, the air outside the vehicle (external air) that flows through the second flow path 3 is used as the regenerating fluid that desorbs moisture from the desiccant part 5.

For that reason, when the regenerating fluid passes through the flow path Sb formed between the wave-shaped base member 52B and the plate-shaped base member 51, the moisture adsorbed by the plate-shaped base member 51, the wave-shaped base member 52B, and the adsorbent Sx surrounding the flow path Sb is incorporated in the regenerating fluid.

As a result, moisture is desorbed from the plate-shaped base member 51, the wave-shaped base member 52A, and the adsorbent Sx surrounding the flow path Sb through which flows the regenerating fluid in the desiccant part 5, and the desiccant part 5 is activated.

Thus, with the desiccant part 5, the area surrounding the flow path Sb through which flows the regenerating fluid taken in from outside the vehicle interior 90 (vehicle exterior) has a lower amount of moisture adsorption than the area surrounding the flow path Sa through which the conditioned air flows.

For that reason, an effect is exhibited of trying to make uniform the distribution of the moisture for the overall desiccant part 5. As a result, moisture moves from the area surrounding the flow path Sa (adsorption area) through which the conditioned air flows, toward the area surrounding the flow path Sb (desorption area) through which flows the regenerating fluid taken in from outside the vehicle interior 90 (vehicle exterior) (see FIG. 3).

Here, the moisture adsorbed by the adsorbent Sx can be moved on the surface of or in the interior of the adsorbent Sx. For that reason, the moisture adsorbed by the adsorbent Sx also moves from the area (adsorption area) surrounding the flow path Sa through which the conditioned air flows, toward the area (desorption area) surrounding the flow path Sb through which flows the regenerating fluid taken in from outside the vehicle interior 90 (vehicle exterior).

Furthermore, as shown in FIGS. 4A and 4B, with the desiccant part 5, the flow path Sa for the conditioned air and the flow path Sb for the regenerating fluid are adjacent sandwiching the plate-shaped base member 51 between them.

For that reason, it is easy for movement of moisture to occur via the plate-shaped base member 51 that is between the conditioned air and the regenerating fluid.

Furthermore, with the desiccant part 5, the wave-shaped base member 52A that defines the flow path Sa of the conditioned air alternately contacts the plate-shaped base member 51 positioned at one side and the plate-shaped base member 51 positioned at the other side sandwiching this wave-shaped base member 52A.

For that reason, the moisture adsorbed from the conditioned air by the wave-shaped base member 52A, after being moved to the plate-shaped base member 51 in contact with the flow path Sb of the regenerating fluid, is desorbed from the surface of the flow path Sb side at this plate-shaped base member 51, and is incorporated in the regenerating fluid (see the enlarged view of FIG. 3).

Furthermore, with the desiccant part 5, the wave-shaped base member 52B that defines the flow path Sb for the regenerating fluid alternately contacts the plate-shaped base member 51 positioned at one side and the plate-shaped base member 51 positioned at the other side sandwiching this wave-shaped base member 52B.

For that reason, the moisture incorporated from the conditioned air and moved to the plate-shaped bases 51, 51 moves via the contact point with the wave-shaped base member 52B to inside the wave-shaped base member 52B. Also, the moisture moved to the wave-shaped base member 52B is desorbed from the surface of the wave-shaped base member 52B and incorporated in the regenerating fluid.

In this way, (1) the moisture adsorbed in the area (adsorption area) surrounding the flow path Sa in the desiccant part 5 removed from the conditioned air is moved to the side at the area surrounding the flow path Sb (desorption area) for which the adsorption amount of moisture is low.

Also, (2) the moisture that moved to the area surrounding the flow path Sb (desorption area) is incorporated in the air outside the vehicle (external air: regenerating fluid) that flows through the flow path Sb.

As a result, in a state for which the respective conditioned air and regenerating fluid continuously flow through the defroster duct 16 and the second flow path 3, the desorption area in the desiccant part 5 always holds an adsorption amount of moisture that is lower than that of the adsorption area in the desiccant part 5.

As a result, the moisture adsorbed by the area surrounding the flow path Sa (adsorption area) of the desiccant part 5 always moves to the side at the area surrounding the flow path Sb (desorption area) of the desiccant part 5, so the adsorption amount of the moisture of the desiccant part 5 does not become saturated.

For that reason, when the moisture adsorption amount of the desiccant part is saturated, the necessity does not arise to perform regenerating processing of the desiccant part, by driving a heater, for example, as was the case with the conventional desiccant part. Specifically, simply by continuously flowing through the regenerating fluid, it is possible to continuously perform dehumidification of the conditioned air (air subject to dehumidification).

As a result, it is possible to reduce the absolute humidity of the conditioned air supplied to inside the vehicle interior 90.

When in the desiccant mode, all of the air supplied to the temperature regulating unit 10 does not have to be air inside the vehicle interior 90 (internal air) taken in from the intake port 21*a*.

The air (internal air) supplied to the temperature regulating unit 10 may also contain air outside the vehicle (external air) taken in from the outside air introduction unit 23.

In this way, when performing dehumidification of conditioned air (air subject to dehumidification), by the moisture adsorbed from the conditioned air by the desiccant part 5 being discharged from the desiccant part 5 to the regenerating fluid (air for recovery), the adsorption amount of the moisture by the desiccant part 5 is prevented from reaching a saturation point.

Here, the air volume of the conditioned air changes according to the air conditioning conditions inside the vehicle interior 90. For example, when it is necessary to heat up the interior of the vehicle interior 90 in a short time as with immediately after starting the heating operation in winter, the air volume of the conditioned air is at a maximum.

When the air volume of the conditioned air is increased, the amount of moisture (dehumidification amount) incorporated in the desiccant part 5 also becomes greater, so it is necessary to increase the amount of moisture discharged from the desiccant part 5 to the regenerating fluid. For that reason, following an increase in air volume of the conditioned air, typically an increase in the air volume of the regenerating fluid is performed.

However, in parallel with dehumidification of the conditioned air, exchange (sensible heat exchange) of the heat quantity between the conditioned air and the regenerating fluid is performed via the desiccant part 5.

For that reason, the temperature of the conditioned air is changed by sensible heat exchange of the conditioned air and the regenerating fluid via the desiccant part 5. Also, when the air volume of the regenerating fluid is increased following an increase in the air volume of the conditioned air, as a result of the exchange amount of the heat quantity increasing, the change in temperature of the conditioned air before and after the desiccant part 5 becomes larger.

For example, during the heating operation of the air conditioning device 1 in winter, the conditioned air is air with a high temperature supplied to inside the vehicle interior 90, and the regenerating fluid is air with a low temperature taken in from outside the vehicle.

In this case, the heat of the conditioned air is taken over by the regenerating fluid side by the sensible heat exchange, and as a result of an increase in the heat quantity discharged wastefully from the conditioned air, this is a factor in a decrease in the heating efficiency of the air conditioning device 1.

The inventors of the present application discovered through experiments that: when the air volume of the conditioned air (air subject to dehumidification) increases, if the air volume of regenerating fluid (air for recovery) is held without changing, the amount of moisture (dehumidification amount) incorporated from the conditioned air to the desiccant part 5 reaches a fixed amount determined according to the air volume of the regenerating fluid; and that even if the air volume of the regenerating fluid (air for recovery) becomes greater than the air volume of the conditioned air (air subject to dehumidification), the moisture amount incorporated in the desiccant part 5 from the conditioned air (air subject to dehumidification) does not rise.

Also, based on this finding, as a result of earnest study, by using the configuration (a) noted hereafter, it was discovered that during the heating operation of the air conditioning device 1 in winter, it is possible to suppress changes in the temperature of the conditioned air due to sensible heat exchange while ensuring the amount of dehumidification of the conditioned air.

(a) After the air volume of the regenerating fluid reaches the air volume by which the target dehumidification amount of the conditioned air is achieved, rather than increasing following the air volume of the conditioned air, the air volume of the air of the regenerating fluid is made to be an air volume that is lower than the air volume of the conditioned air, and an air volume that can achieve the target dehumidification amount or greater.

Hereafter, explained is control when the operating mode of the air conditioning device 1 is the desiccant mode in winter, which is air volume control of the conditioned air (air subject to dehumidification) and regenerating fluid (air for recovery).

Figure 5:
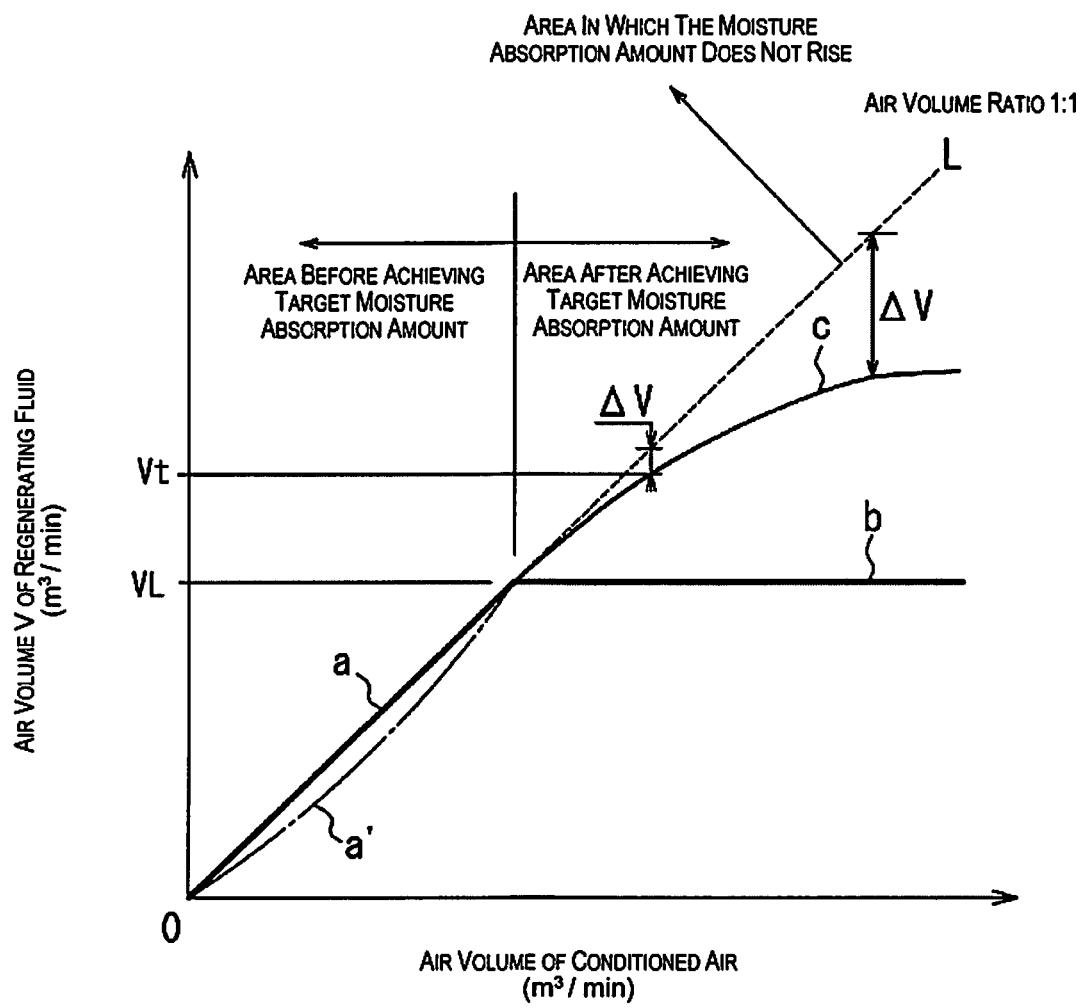
FIG. 5 is a drawing for explaining the air volume ratio of the air subject to dehumidification and the air for recovery.

FIG. 5 is a drawing explaining the relationship of the air volume ratio between the conditioned air (air subject to dehumidification) and regenerating fluid (air for recovery).

The control device 7 drives motors M1, M2 (see FIG. 1), and rotates rotors 61, 61 of sirocco fans 6A, 6B.

When the rotor 61 of the sirocco fan 6A rotates, the air volume of the conditioned air that flows through the defroster duct 16 changes according to the rotation speed of the rotor 61.

When the rotor 61 of the sirocco fan 6B rotates, the air volume of the regenerating fluid that flows through the second flow path 3 changes according to the rotation speed of the rotor 61.

When the operating mode of the air conditioning device 1 goes to the desiccant mode, the control device 7 places the partition wall 411 of the switching valve 41 in the inside air introduction position (see FIG. 1: solid line).

Furthermore, the control device 7 opens at least the on-off valve 16v, and has the temperature regulating unit 10 and the inside of the vehicle interior 90 communicate via the defroster duct 16.

Also, the control device 7 drives the motor M1 to rotate the rotor 61 of the sirocco fan 6A.

As a result, air (internal air) taken in from inside the vehicle interior 90 is supplied to the temperature regulating unit 10 of the air conditioning device 1, and air (conditioned air) for which the temperature is regulated by the temperature regulating unit 10 is supplied to the defroster duct 16.

Furthermore, the control device 7 drives the motor M2 to rotate the rotor 61 of the sirocco fan 6B. As a result, air of outside the vehicle (regenerating fluid) flows into the second flow path 3.

Thus, with the desiccant part 5 provided in the intersection area 25 of the defroster duct 16 and the second flow path 3, conditioned air (air subject to dehumidification) flows through the flow path Sa formed by the wave-shaped base member 52A, and regenerating fluid (air for recovery) flows through the flow path Sb formed by the wave-shaped base member 52B.

Signals indicating the temperature and relative humidity inside the vehicle interior 90, and signals indicating the temperature and relative humidity outside the vehicle are input from a temperature sensor and a humidity sensor (see FIG. 2) to the control device 7.

The control device 7 calculates absolute humidity H_in inside the vehicle from the temperature and relative humidity inside the vehicle interior 90 (vehicle interior), and also calculates absolute humidity H_out outside the vehicle from the temperature and the relative humidity of outside the vehicle interior 90 (vehicle exterior).

Furthermore, the control device 7 finds the difference between the vehicle interior absolute humidity H_in and the vehicle exterior absolute humidity H_out (absolute humidity difference ΔH), and from the found absolute humidity difference ΔH and a target moisture absorption amount MC_target determined according to the vehicle, an air volume V of the regenerating fluid that flows through the second flow path 3 is determined.

With the present embodiment, 1.5 m³/min is set as the minimum air volume (the lower limit air volume VL).

With the present embodiment, the control device 7 increases the air volume V of the regenerating fluid following an increase in the air volume of the conditioned air during the time until the air volume V of the regenerating fluid reaches a lower limit air volume VL.

At this time, the control device 7 increases the air volume V of the regenerating fluid with a designated correlation to the increase in the air volume of the conditioned air.

FIG. 5 shows a case of, during the time until the air volume V of the regenerating fluid reaches the lower limit air volume VL (area before achieving the target moisture absorption amount), increasing the air volume V of the regenerating fluid in a 1:1 relation to the increase in the air volume of the conditioned air (area of solid line a).

While increasing the air volume V of the regenerating fluid along this solid line a, the air volume of the conditioned air and the air volume V of the regenerating fluid are always approximately the same air volume.

Here, the relationship until the air volume V of the regenerating fluid reaches the lower limit air volume VL, which is the relationship of the air volume of the conditioned air and the air volume V of the regenerating fluid, is not limited to only the mode shown by the solid line a in this FIG. 5.

For example, it is also possible to make it so that while the air volume V of the regenerating fluid is made to be slightly smaller than the air volume of the conditioned air, the air volume of the regenerating fluid is increased toward the lower limit air volume VL (in the drawing, see the dot-dash line a').

With the present embodiment, the control device 7, after the air volume V of the regenerating fluid has reached the lower limit air volume VL, makes it so that a target value Vt of the air volume V of the regenerating fluid is not increased with a 1:1 relationship following an increase in the air volume of the air for air conditioning.

In specific terms, the setting is to a value that is smaller than the line segment (see FIG. 5, dashed line L) that stipulates the air volume V with a 1:1 relationship to the air volume of the air for air conditioning.

In the area for which the air volume V of the regenerating fluid is greater than the lower limit air volume VL (area after achieving the target moisture absorption amount), as the air volume V increases, the sensible heat exchange amount between the conditioned air and the regenerating fluid via the desiccant part 5 becomes greater.

When the desiccant mode is performed during the heating operation of the air conditioning device 1 in winter, the conditioned air is air with a high temperature regulated by the temperature regulating unit 10, and the regenerating fluid is air of a low temperature incorporated from outside the vehicle, so the temperature of the conditioned air is decreased by the sensible heat exchange.

Having done that, the conditioned air supplied to inside the vehicle interior 90, though it is dehumidified by the desiccant part 5 and the absolute humidity becomes lower, it is supplied to inside the vehicle interior 90 at a temperature lower than the targeted temperature (target temperature).

In this case, to air condition the inside of the vehicle interior 90 to the target temperature, it is necessary to make the temperature of the conditioned air regulated by the temperature regulating unit 10 higher, and the heating efficiency of the air condition device 1 is decreased.

When the air volume of the regenerating fluid is simply increased following an increase of the air volume of the conditioned air, the temperature change of the conditioned air due to the sensible heat exchange becomes greater, so the conditioned air after dehumidification by the desiccant part 5 has an increase in the divergence width from the target temperature.

Having done that, the heating efficiency in the air conditioning device 1 is decreased even further.

With the present embodiment, the control device 7, by having the air volume of the regenerating fluid be an air volume that is lower than the air volume of the conditioned air, makes the level of temperature change (level of temperature decrease) of the conditioned air due to sensible heat exchange smaller.

As a result, the divergence width of the conditioned air from the target temperature is made smaller, and the heating efficiency of the air conditioning device 1 is improved.

In particular, the control device 7 sets the air volume of the regenerating fluid to be less than the air volume for which the relationship is 1:1 to the air volume of the conditioned air, and also, sets the lower limit of the air volume of the regenerating fluid to the air volume VL (lower limit air volume) that achieves the target dehumidification amount of the conditioned air.

For that reason, while maintaining the air volume VL of the regenerating fluid necessary to achieve the target dehumidification amount of the conditioned air, the air volume of the regenerating fluid is suppressed to an air volume that is lower than the air volume of the conditioned air. As a result, while ensuring the target dehumidification amount of the conditioned air, the temperature of the conditioned air is prevented from diverging greatly from the target temperature due to sensible heat exchange.

In this case, the control device 7 determines the air volume V of the regenerating fluid using any of (a) to (c) noted hereafter.

(a) After the air volume V of the regenerating fluid has reached the lower limit air volume VL, the air volume V of the regenerating fluid holds the lower limit air volume VL without relation to the increase in conditioned air (see line segment b in FIG. 5).

(b) After the air volume V of the regenerating fluid has reached the lower limit air volume VL, the air volume V of the regenerating fluid is set to within a range of an air volume greater than the lower limit air volume VL, and an air volume smaller than the air volume of the conditioned air (between the dashed line L and the line segment b in FIG. 5).

(c) In the case of (b), as the air volume of the conditioned air increases, the divergence amount ΔV from the air volume corresponding 1:1 to the air volume of the conditioned air becomes larger (see line segment c in FIG. 5).

By working in this way, while ensuring the dehumidification amount of the conditioned air, the divergence width from the targeted temperature of the conditioned air is made small, and the heating efficiency of the air conditioning device is improved.

In the case of (b) and (c), it is preferable to prepare in advance through experimentation, etc., map data that regulates the relationship between the air volume of the conditioned air and the air volume V of the regenerating fluid. Also, the control device 7 may also be made to reference the map data stored in the memory based on the air volume of the conditioned air to determine the air volume V of the regenerating fluid.

Also, it is preferable to set in advance through experimentation, etc., the lower limit air volume VL of the regenerating fluid necessary to achieve the target dehumidification amount of the conditioned air.

In this case, it is preferable to set the lower limit air volume VL using as a reference the time when the absolute humidity difference ΔH between the absolute humidity H_in of the vehicle interior and the absolute humidity H_out of the vehicle exterior is at its minimum.

When the absolute humidity difference ΔH is smaller, the movement amount of the moisture from the conditioned air to the regenerating fluid becomes smaller, and the amount of moisture adsorbed from the conditioned air (moisture absorption amount) becomes smaller.

Thus, when using as a reference the time when the absolute humidity difference ΔH is at its minimum, the set lower limit air volume VL becomes the minimum air volume of regenerating fluid necessary to dehumidify the conditioned air.

With the present embodiment, it is preferable to consider a target moisture absorption amount MC_target that is determined according to the vehicle for the setting of the lower limit air volume VL.

Elements that affect the absolute humidity inside the vehicle interior 90 include the fixed number of passengers of the vehicle V, and the volumetric capacity inside the vehicle interior 90. The fixed number of passengers and the volumetric capacity inside the vehicle interior 90 differ for each vehicle, so by considering the target moisture absorption amount MC_target determined according to the vehicle, it is possible to suitably determine the minimum air volume of the regenerating fluid necessary to dehumidify the conditioned air.

The operating modes of the air conditioning device 1 include, in addition to the desiccant mode, an external air/internal air mixed mode, an external mode, and an internal air mode.

In any of the modes including the external air/internal air mixed mode, the external air mode, and the internal air mode, the control device 7 does not drive the sirocco fan 6B attached in the second flow path 3.

For that reason, the air outside the vehicle (external air) that functions as the regenerating fluid does not flow through the inside of the second flow path 3, so the conditioned air that flows through the defroster duct 16 is supplied to inside the vehicle interior 90 as is without being dehumidified.

As described above, the air condition device 1 for a vehicle of the embodiment has the configuration noted hereafter.

(1) The air conditioning device for a vehicle 1 has: the desiccant part 5 capable of adsorbing moisture contained in conditioned air (air subject to dehumidification), and discharging the adsorbed moisture to the regenerating fluid (air for recovery), the defroster duct 16 (first flow path) through which conditioned air flows, the second flow path 3 through which the regenerating fluid flows, and the control device 7

(controller) that controls the air volume of the conditioned air in the defroster duct 16, and the air volume of the regenerating fluid in the second flow path 3.

The desiccant part 5 is provided straddling the defroster duct 16 and the second flow path 3. With the air conditioning device 1, the moisture contained in the conditioned air is adsorbed by the desiccant part 5, and the conditioned air is dehumidified.

With the control device 7, after the air volume V of the regenerating fluid has reached the air volume VL by which the target dehumidification amount of the conditioned air is achieved, the air volume V of the regenerating fluid is made to be an air volume that is less than the air volume of the conditioned air.

When the air volume of the conditioned air increases, the amount of moisture incorporated in the desiccant part 5 (dehumidification amount) becomes greater.

For that reason, to prevent saturation of the moisture adsorbed by the desiccant part 5, it is necessary to increase the flow amount of the regenerating fluid following an increase in the air volume of the conditioned air, and increase the amount of moisture discharged from the desiccant part 5 to the regenerating fluid.

However, with the desiccant part 5, in parallel with the dehumidification of the conditioned air, an exchange of the heat quantity between the conditioned air and the regenerating fluid (sensible heat exchange) is performed. Also, the total amount of the exchanged heat quantity becomes greater as the flow amount of the regenerating fluid increases. Thus, when the air volume of the regenerating fluid is increased, as a result of the exchange amount of the heat quantity increasing, the change in temperature of the conditioned air before and after the desiccant part 5 becomes greater.

As noted above, after the air volume V of the regenerating fluid reaches the air volume VL by which the target dehumidification amount of the conditioned air is achieved, when the air volume V of the regenerating fluid is made to be an air volume less than the air volume of the conditioned air, the kind of effects hereafter can be obtained.

(a) While achieving the target dehumidification amount of the conditioned air (air subject to dehumidification), it is possible to suppress the exchange amount of the heat quantity via the desiccant part 5 between the regenerating fluid (air for recovery) and the conditioned air (air subject to dehumidification).

(b) As a result of suppression of the sensible heat transfer via the desiccant part 5 between the regenerating fluid (air for recovery) and the conditioned air (air subject to dehumidification), it is possible to suppress the heat quantity exhausted wastefully from the conditioned air (air subject to dehumidification) by the sensible heat exchange.

(c) During the heating operation of the air conditioning device 1 in winter, compared to when increasing the air volume of the regenerating fluid (air for recovery) following an increase in the air volume of the conditioned air (air subject to dehumidification), it is possible to hold the temperature of the desiccant part 5 to a high temperature.

(d) When the temperature of the desiccant part 5 is high, the activation energy of the material side (plate-shaped base member 51, wave-shaped base member 52, adsorbent Sx) becomes higher, so the moisture movement speed becomes faster.

The air conditioning device 1 has the following configuration.

(2) The control device 7, after the air volume V of the regenerating fluid reaches the air volume VL for which the target dehumidification amount of the conditioned air is achieved, sets the lower limit of the air volume of the conditioned air to an air volume VL for which the target dehumidification amount of the air subject to dehumidification is achieved.

When configured in this way, it is possible to suppress the heat quantity exhausted wastefully from the conditioned air due to the sensible heat exchange between the conditioned air and the regenerating fluid via the desiccant part 5.

It is also possible to make the divergence width smaller between the temperature of the conditioned air and the target temperature after dehumidification by the desiccant part 5.

As a result, during the heating operation of the air conditioning device 1 in winter, it is possible to make the temperature of the conditioned air after dehumidification be a temperature closer to the target temperature.

Thus, because the conditioned air after dehumidification is supplied to inside the vehicle interior 90 at the target temperature, it is possible to suppress the level at which the temperature of the conditioned air regulated by the temperature regulating unit 10 becomes high. Thus, it is possible to suppress a decrease in heating efficiency in the air conditioning device 1.

The air conditioning device 1 has the following configuration.

(3) The control device 7, after the air volume V of the regenerating fluid reaches the air volume VL for which the target dehumidification amount of the conditioned air is achieved, holds the air volume of the regenerating fluid at the air volume VL at which the target dehumidification amount of the conditioned air is achieved.

When configured in this way, while ensuring the target dehumidification amount of the conditioned air, it is possible to suppress the heat quantity that is exhausted wastefully from the conditioned air due to sensible heat exchange.

The air conditioning device 1 has the following configuration.

(4) The defroster duct 16 (first flow path) is a flow path through which flows air (conditioned air) for which the temperature is regulated by the temperature regulating unit 10 that the air condition device of a vehicle 1 is provided with, and the second flow path 3 is a flow path through which flows air taken in from outside the vehicle (external air: regenerating fluid).

When configured in this way, during the heating operation of the air conditioning device 1 in winter, the conditioned air (air subject to dehumidification) is air of a high temperature supplied to inside the vehicle interior 90, and the regenerating fluid (air for recovery) is air of a low temperature taken in from outside the vehicle.

In this case, compared to a case of increasing the air volume of the regenerating fluid following an increase in the air volume of conditioned air, it is possible to suppress the heat quantity exhausted wastefully from the conditioned air due to the sensible heat exchange.

As a result, it is possible to suppress the level of decrease in temperature of the conditioned air for which the temperature is regulated, so it is possible to suppress a decrease in the heating efficiency in the air conditioning device 1.

The air conditioning device 1 has the following configuration.

(5) The desiccant part 5 is provided at the intersection area 25 at which the defroster duct 16 (first flow path) and the second flow path 3 intersect.

With the desiccant part 5 provided in the intersection area 25, it is easy for sensible heat transfer to occur via the desiccant part 5 between the conditioned air (air subject to dehumidification) and the regenerating fluid (air for recovery).

For that reason, by configuring as described above, it is possible to suppress the heat quantity exhausted wastefully from the conditioned air (air subject to dehumidification) due to sensible heat exchange.

The air conditioning device 1 has the following configuration.

(6) The desiccant part 5 has: a plurality of plate-shaped bases 51 aligned with intervals open, and a wave-shaped base member 52 placed between adjacent plate-shaped bases 51, 51 in the plate-shaped base member 51 alignment direction.

The wave-shaped base member 52 is provided alternately in contact with the plate-shaped base member 51 positioned at one side and the plate shaped base member 51 positioned at the other side sandwiching that wave-shaped base member 52.

The wave-shaped base member 52 forms the flow path S for air between the plate-shaped base member 51 of one side and the plate-shaped base member 51 of the other side.

The wave-shaped base member 52 has the wave-shaped base member 52A (first wave-shaped base member) forming the flow path Sa (flow passage) for the conditioned air (air subject to dehumidification), and the wave-shaped base member 52B (second wave-shaped base member) forming the flow path Sb (flow passage) for the regenerating fluid (air for recovery).

With the desiccant part 5, the wave-shaped base member 52A and the wave-shaped base member 52B are alternately placed in the plate-shaped base member 51 alignment direction.

With the desiccant part 5 of this kind of configuration, the flow path Sa (flow passage for the conditioned air (air subject to dehumidification) and the flow path Sb (flow passage) for the regenerating fluid (air for recovery) are adjacent with the plate-shaped base member 51 sandwiched between.

For that reason, it is easier for sensible heat transfer to occur between the conditioned air (air subject to dehumidification) and the regenerating fluid (air recovery).

For that reason, after the air volume V of the regenerating fluid reaches the air volume VL for which the target dehumidification amount of the conditioned air is achieved, it is possible to suppress the heat quantity exhausted wastefully from the air subject to dehumidification due to the sensible heat exchange, by making the air volume V of the regenerating fluid be an air volume that is less than the air volume of the air subject to dehumidification.

The air conditioning device 1 has the following configuration.

(7) The control device 7, during the time until the air volume VL is reached by which the target dehumidification amount of the conditioned air is achieved, increases the air volume of the regenerating fluid (air for recovery) having a designated correlation to the increase in air volume of the conditioned air (air subject to dehumidification), preferably increased having a correlation of 1:1 (see FIG. 5, solid line a).

When this kind of configuration is used, during the time until the air volume V of the regenerating fluid reaches the air volume VL by which the target dehumidification amount of the conditioned air is achieved, the amount of moisture desorbed from the desiccant part 5 is ensured, and it is possible to suitably prevent the desiccant part 5 from being saturated by the air taken in from the conditioned air.

The air conditioning device 1 has the following configuration.

(8) The lower limit value VL of the air volume V of the regenerating fluid by which the target dehumidification amount of the conditioned air is achieved is 1.5 m³/min.

When this kind of configuration is used, while ensuring the target dehumidification amount of the conditioned air, it is possible to suppress the heat quantity exhausted wastefully from the conditioned air due to sensible heat exchange.

Second Embodiment

Next, an air conditioning device 1A of a second embodiment of the present invention is explained.

Figure 6:
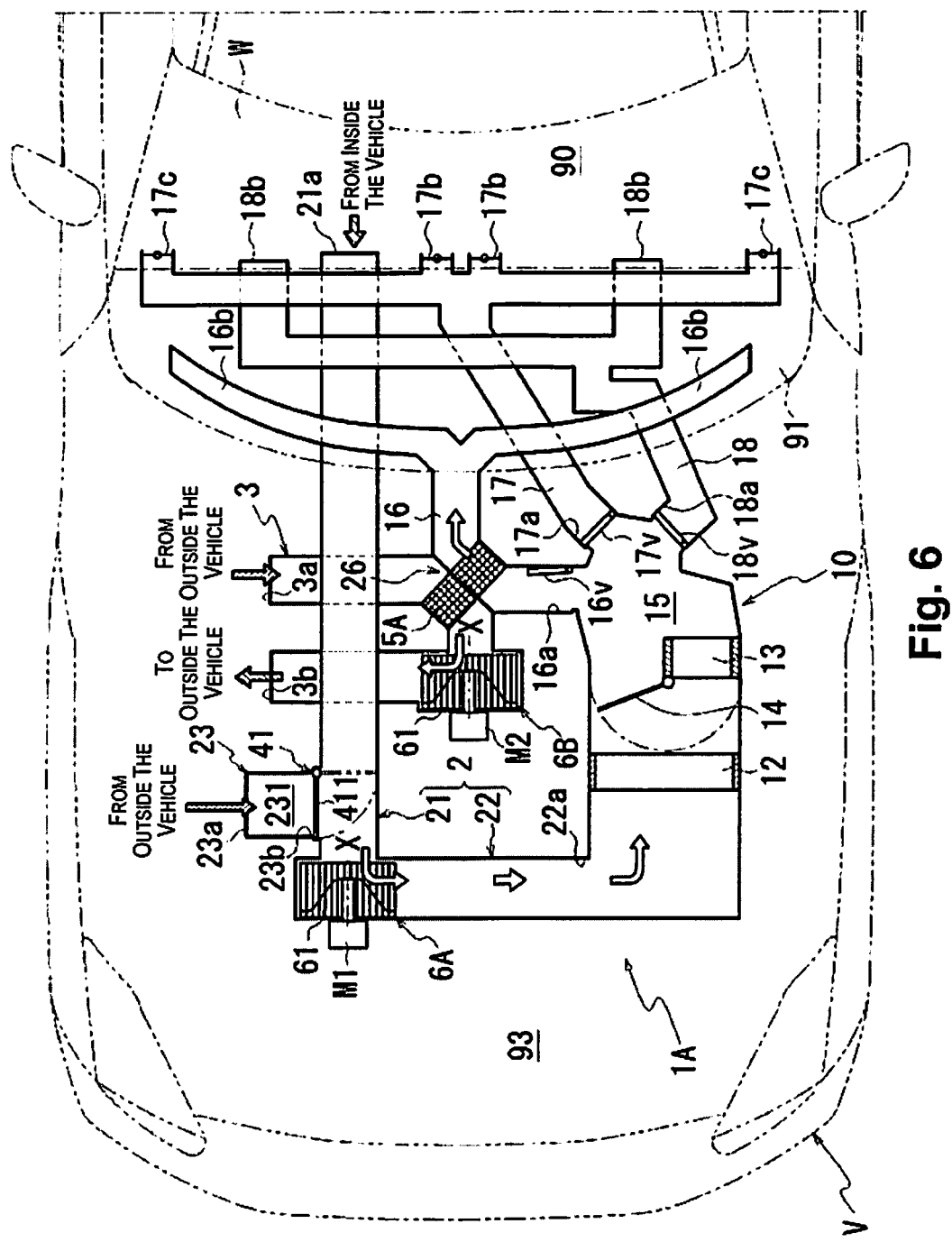
FIG. 6 is a schematic block diagram of the air conditioning device of a vehicle of a second embodiment.

FIG. 6 is a schematic block diagram of the air conditioning device for a vehicle 1A of the present embodiment.

As shown in FIG. 6, the air conditioning device 1A has a contact area 26 provided with the defroster duct 16 and the second flow path 3 in contact with each other's wall parts.

With this contact area 26, a desiccant part 5A is provided straddling the defroster duct 16 and the second flow path 3.

The desiccant part 5A is provided in a direction (orthogonal direction) intersecting with the flow through direction of the air in the defroster duct 16 and the second flow path 3.

Figure 7A:
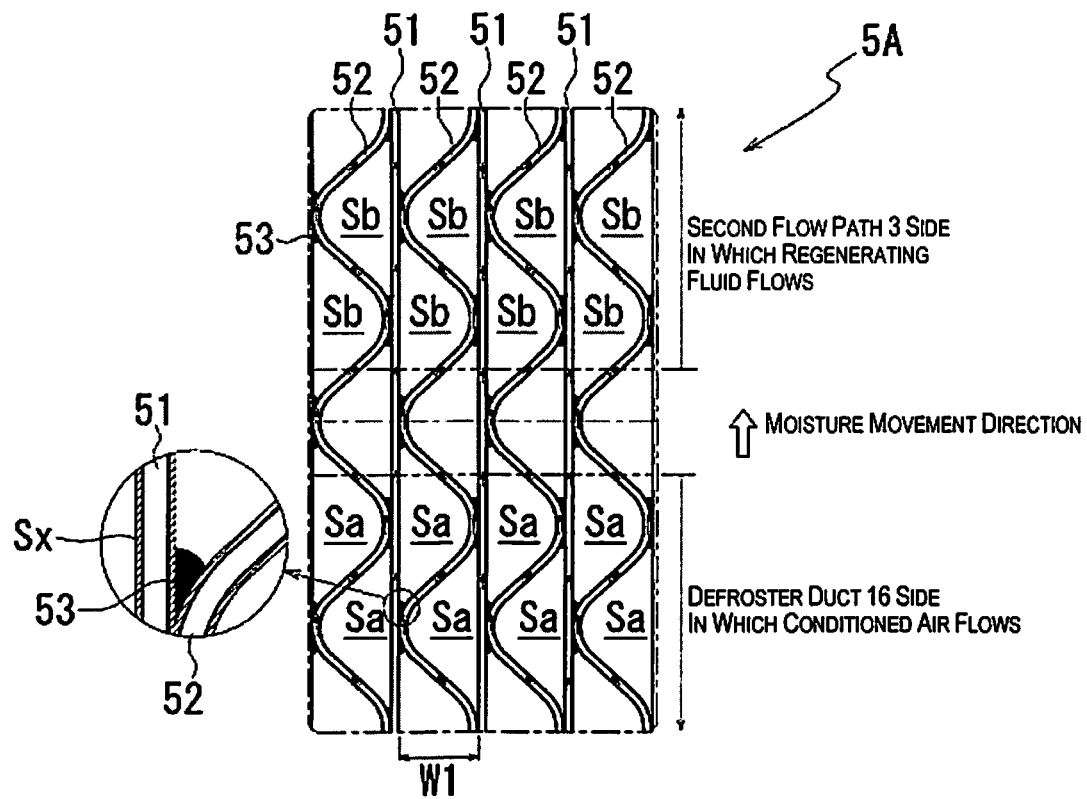
FIG. 7A is a drawing for explaining the basic configuration and operation of the desiccant part.
Figure 7B:
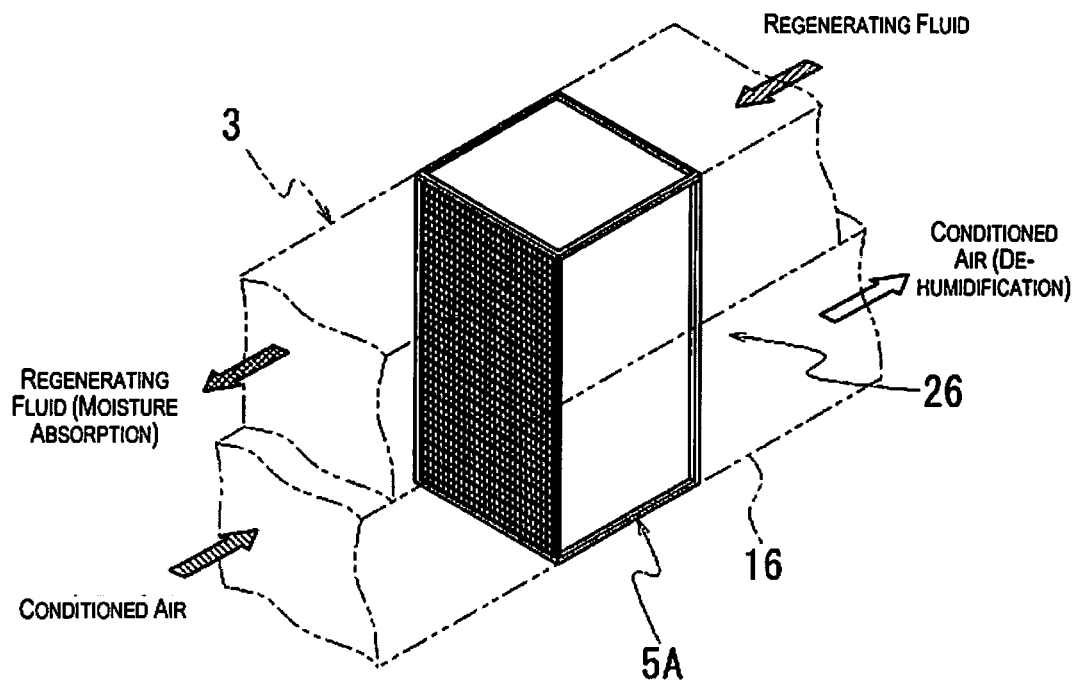
FIG. 7B is a perspective view for explaining the placement of the desiccant part.

FIGS. 7A and 7B are drawings for explaining the desiccant part 5A. FIG. 7A is a drawing for explaining the basic configuration and operation of the desiccant part 5A, and FIG. 7B is a perspective view for explaining the placement of the desiccant part 5A.

As shown in FIG. 7A, the desiccant part 5A has the plurality of plate-shaped bases 51 placed approximately in parallel with intervals open with each other, and the wave-shaped base member 52 placed between the plate-shaped bases 51, 51.

The wave-shaped base member 52 is provided between the adjacent pair of plate-shaped bases 51, 51 in the alignment direction of the plate-shaped bases 51.

The wave-shaped base member 52 is provided in alternate contact with the plate-shaped base member 51 positioned at one side and the plate-shaped base member 51 positioned at the other side sandwiching the wave-shaped base member 52 in the lengthwise direction of that wave-shaped base member 52.

The contact part of the wave-shaped base member 52 and the plate-shaped bases 51 is adhered by the adhesive agent 53, and by positioning the wave-shaped base member 52 between the plate-shaped bases 51, 51 placed in parallel to each other, the rigidity strength of the overall desiccant part 5A is increased.

With this embodiment, the spaces S (Sa, Sb) surrounded by the plate-shaped bases 51 and the wave-shaped base member 52 in the desiccant part 5A are flow paths (hereafter, the spaces Sa, Sb are also noted as flow paths Sa, Sb) through which flow air (conditioned air, regenerating fluid).

With the desiccant part 5A, on the surface of the plate-shaped base member 51 and the wave-shaped base member 52, it is preferable to support a material capable of adsorbing and desorbing moisture such as a polymer type adsorbent Sx or an inorganic adsorbent.

As shown in FIG. 7A, the desiccant part 5A has the flow paths Sa, Sb provided straddling the defroster duct 16 and the second flow path 3 in a direction along the movement direction of the air (conditioned air, regenerating fluid) in the defroster duct 16 and the second flow path 3.

For that reason, when conditioned air flows through the inside of the defroster duct 16, and regenerating fluid flows through the inside of the second flow path 3, the moisture contained in the conditioned air is made to be adsorbed in the area positioned inside the defroster duct 16 in the plate-shaped base member 51 and the wave-shaped base member 52 (adsorption area).

Also, the adsorbed moisture moves to the area (desorption area) positioned inside the second flow path 3 in the plate-shaped base member 51 and the wave-shaped base member 52, and is made to be incorporated in the regenerating fluid that flows through the inside of the second flow path 3.

For that reason, the same as in the case of the first embodiment described above, in a state with the defroster duct 16 and the second flow path 3 respectively having conditioned air and regenerating fluid flow through continuously, the adsorption amount of the moisture does not become saturated in the desiccant part 5A.

In the air conditioning device 1A provided with this desiccant part 5A as well, the configuration (a) hereafter is adopted, and during the heating operation of the air conditioning device 1 in winter, while ensuring the dehumidification amount of the conditioned air, it is possible to suppress changes in the temperature of conditioned air due to sensible heat exchange.

(a) After the air volume of the regenerating fluid reaches the air volume by which the target dehumidification amount of the conditioned air is achieved, the air volume of the air of the regenerating fluid is not increased following the air volume of the conditioned air, but rather is made to be an air volume that is smaller than the air volume of the conditioned air, and is the air volume by which the target dehumidification amount can be achieved or greater.

Specifically, with this embodiment as well, the control device 7, during the time until the air volume V of the regenerating fluid reaches the air volume VL by which the target dehumidification amount is achieved, has the air volume V of the regenerating fluid increase following an increase in the air volume of the conditioned air.

At this time, the control device 7 increases the air volume V of the regenerating fluid with a designated correlation to the increase in the air volume of the conditioned air.

Also, the control device 7, after the air volume V of the regenerating fluid reaches the lower limit air volume VL, makes it so that the target value Vt of the air volume V of the regenerating fluid does not increase in a 1:1 correlation following an increase in the air volume of the air for air conditioning.

In specific terms, the setting is to a value smaller than the line segment (see FIG. 5, dashed line L) that stipulates the air volume V that has a 1:1 correlation to the air volume of the air for air conditioning.

The control device 7 determines the air volume V of the regenerating fluid using one of (a) to (c) noted hereafter.

(a) After the air volume V of the regenerating fluid reaches the lower limit air volume VL, without relation to an increase in the conditioned air, the air volume V of the regenerating fluid is held at the lower limit air volume VL (see line segment b in FIG. 5).

(b) After the air volume V of the regenerating fluid reaches the lower limit air volume VL, the air volume V of the regenerating fluid is set within a range of an air volume greater than the lower limit air volume VL, and an air volume smaller than the air volume of the conditioned air (between the dashed line L and line segment b in FIG. 5).

(c) In the case of (b), as the air volume of the conditioned air increases, the divergence amount ΔV from the air volume corresponding 1:1 with the air volume of the conditioned air is made larger (see line segment c in FIG. 5).

By working in this way, while ensuring the dehumidification amount of the conditioned air, the divergence width from the temperature targeted for the conditioned air is made small, and the heating efficiency of the air conditioning device is increased.

As described above, the air conditioning device for a vehicle 1A of the second embodiment has the configuration noted hereafter.

(9) The air conditioning device for a vehicle 1A has: the desiccant part 5A capable of adsorbing the moisture contained in conditioned air (air subject to dehumidification), and of discharging the adsorbed moisture to the regenerating fluid (air for recovery), the defroster duct 16 (first flow path) through which flows the conditioned air, the second flow path 3 through which flows the regenerating fluid, and the control device 7 (controller) that controls the air volume of the conditioned air for the defroster duct 16, and the air volume of the regenerating fluid for the second flow path 3.

The desiccant part 5A is provided in the contact area 26 in which the defroster duct 16 and the second flow path 3 are provided in contact with each other's wall parts.

The desiccant part 5A is provided straddling the defroster duct 16 and the second flow path 3.

With the air conditioning device 1, moisture contained in the conditioned air is adsorbed and conditioned air is dehumidified by the desiccant part 5A.

The control device 7, after the air volume V of the regenerating fluid has reached the air volume VL by which the target dehumidification amount of the conditioned air is achieved, sets the air volume V of the regenerating fluid to an air volume smaller than the air volume of the air subject to dehumidification.

When configured as described above, the following kinds of effects can be obtained.

(a) While achieving the target dehumidification amount of the conditioned air (air subject to dehumidification), it is possible to suppress the exchange amount of the heat quantity via the desiccant part 5A between the regenerating liquid (air for recovery) and the conditioned air (air subject to dehumidification).

(b) As a result of suppressing the sensible heat transfer via the desiccant part 5A between the regenerating fluid (air for recovery) and the conditioned air (air subject to dehumidification), it is possible to suppress the heat quantity exhausted wastefully from the conditioned air (air subject to dehumidification) due to sensible heat exchange.

(c) During the heating operation of the air conditioning device 1A in winter, compared to when increasing the air volume of the regenerating fluid (air for recovery) following an increase in the air volume of the conditioned air (air subject to dehumidification), it is possible to hold the temperature of the desiccant part 5A to a high temperature.

(d) When the temperature of the desiccant part 5A becomes high, the activation energy of the material side (plate shaped base member 51, wave-shaped base, adsorbent Sx) becomes high, so the movement speed of the moisture becomes faster.

Third Embodiment

Next, an air conditioning device 1B of a third embodiment of the present invention is explained.

Figure 8:
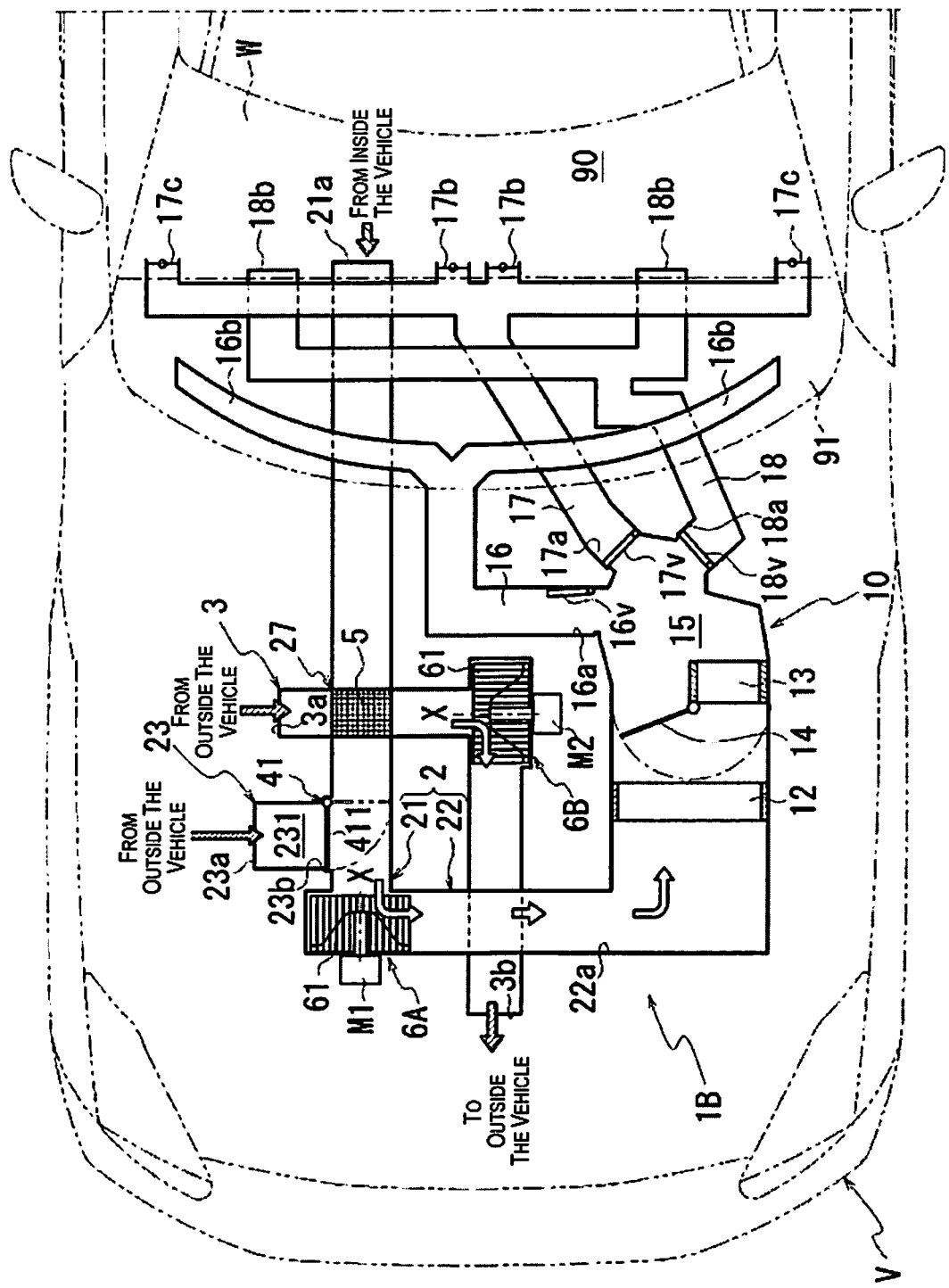
FIG. 8 is a schematic block diagram of the air conditioning device for a vehicle of a third embodiment.

FIG. 8 is a schematic block diagram of the air conditioning device for a vehicle 1B of the present embodiment.

As shown in FIG. 8, the air conditioning device 1B has an intersection area 27 in which the second flow path 3 intersects with the flow passage 21 of the first flow path 2, and the desiccant part 5 is provided in this intersection area 27.

During the heating operation in winter, when the operating mode of the air conditioning device 1B is the desiccant mode, the air with a high temperature and absolute humidity incorporated from inside the vehicle interior 90 (internal air: air subject to dehumidification) flows through the intersection area 27. This internal air is air of a higher temperature than the regenerating fluid (external air: air for recovery) that flows through the second flow path 3. For that reason, the same as with the case of the first embodiment described above, sensible heat transfer occurs via the desiccant part 5 between the internal air (air subject to dehumidification) and the external air (air for recovery).

Thus, in the case of this air conditioning device 1B as well, the configuration (a) noted hereafter is adopted, and during the heating operation of the air conditioning device 1 in winter, while ensuring the dehumidification amount of the internal air (air subject to dehumidification), it is possible to suppress change in the temperature of the internal air (air subject to dehumidification) due to sensible heat exchange.

(a) After the air volume of the regenerating fluid reaches the air volume for which the target dehumidification amount of the internal air (air subject to dehumidification) is achieved, the air volume of the regenerating fluid, is not increased following the air volume of the internal air (air subject to dehumidification), but rather is made to be an air volume that is lower than the air volume of the internal air (air subject to dehumidification), and an air volume that can achieve the target dehumidification amount or greater.

As described above, the air conditioning device for a vehicle 1B of the third embodiment has the configuration noted hereafter.

(10) The air conditioning device for a vehicle 1B has: the desiccant part 5 capable of adsorbing the moisture contained in the air (air subject to dehumidification: internal air) taken in from inside the vehicle interior 90, and of discharging the adsorbed moisture to the regenerating fluid (air for recovery: external air), the first flow path 2 through which flows at least the air (internal air) taken in from inside the vehicle interior 90, the second flow path 3 through which flows the regenerating fluid, and the control device 7 (controller) that controls the air volume of the internal air (air subject to dehumidification) in the first flow path 2, and the air volume of the regenerating fluid (air for recovery) in the second flow path 3.

The desiccant part 5 is provided in the intersection area 27 of the flow passage 21 of the second flow path 3 and the second flow path 3.

The desiccant part 5 is provided straddling the flow passage 21 and the second flow path 3.

With the air conditioning device 1, the moisture contained in the internal air is made to be adsorbed and the conditioned air dehumidified by the desiccant part 5.

The control device 7, after the air volume V of the regenerating fluid reaches the air volume VL for which the target dehumidification amount of the internal air (air subject to dehumidification) is reached, sets the air volume V of the regenerating fluid to an air volume that is lower than the air volume of the internal air (air subject to dehumidification).

When using the air conditioning device 1B with this kind of configuration as well, the following kind of effects are obtained.

(a) While achieving the target dehumidification amount of the internal air (air subject to dehumidification), it is possible to suppress the exchange amount of the heat quantity via the desiccant part 5 between the regenerating fluid (air for recovery) and the internal air (air subject to dehumidification).

(b) As a result of suppression of the sensible heat transfer via the desiccant part 5 between the regenerating fluid (air for recovery) and the internal air (air subject to dehumidification), it is possible to suppress the heat quantity exhausted wastefully from the internal air (air subject to dehumidification) due to sensible heat exchange.

(c) During the heating operation of the air conditioning device 1 in winter, compared to when increasing the air volume of the regenerating fluid (air for recovery) following an increase in the air volume of the internal air (air subject to dehumidification), it is possible to hold the temperature of the desiccant part 5 at a high temperature.

(d) When the temperature of the desiccant part is high, the activation energy of the desiccant part side (plate-shaped base member 51, wave-shaped base, adsorbent Sx) becomes high, so the movement speed of the moisture is faster.

The air subject to dehumidification is not limited to a mode of being only the air (internal air) taken in from inside the vehicle interior 90, but rather may also be mixed air with air (external air) of outside the vehicle taken in from the intake port 3a.

Figure 9:
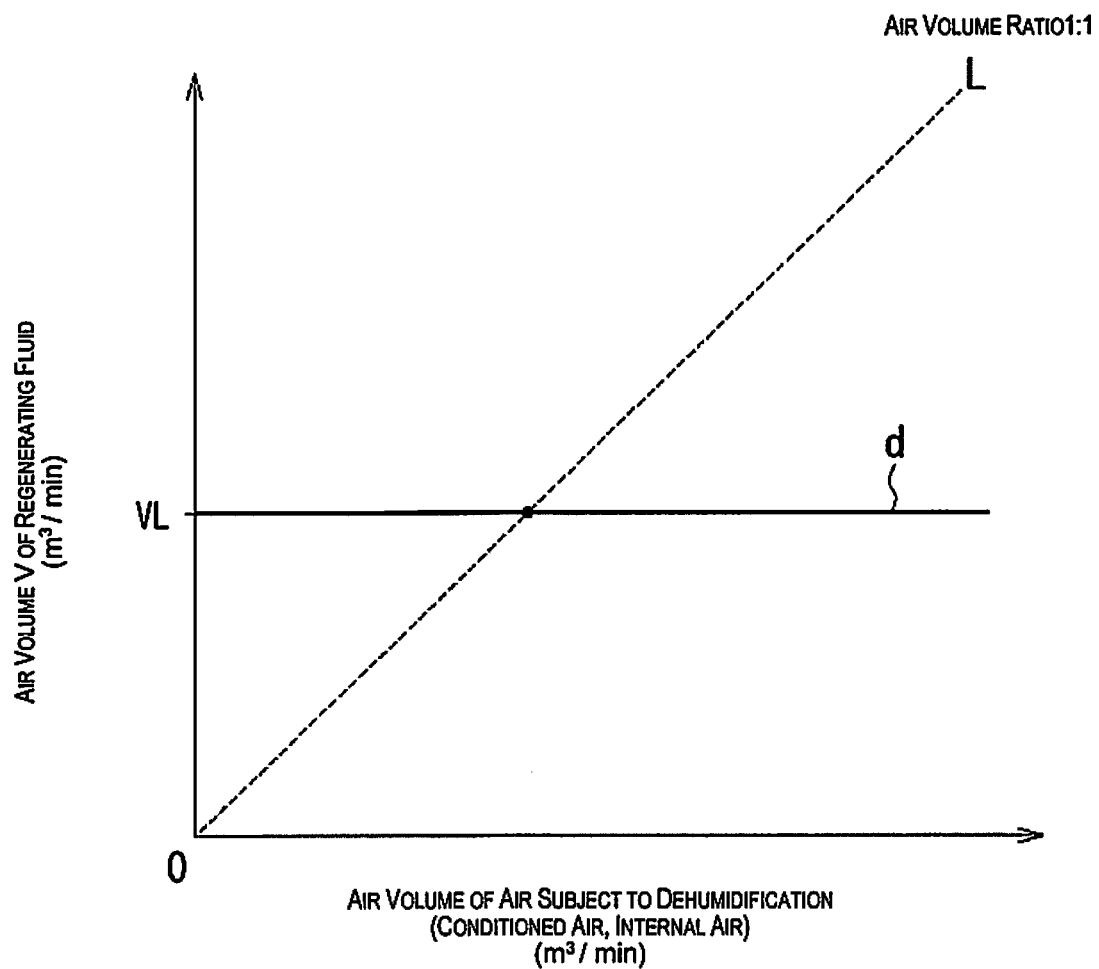
FIG. 9 is a drawing for explaining the air volume ratio of the air subject to dehumidification and the air for recovery of a modification example.

FIG. 9 is a drawing explaining the relationship of the air volume ratio of the air subject to dehumidification (conditioned air, internal air) and the air for recovery (regenerating fluid) of the modification example.

This FIG. 9 shows a case when the air volume of the air subject to dehumidification (conditioned air, internal air) increases at a fixed ratio (see dashed line L), whereas the air for recovery (regenerating fluid) is held at the lower limit air volume VL by which the target moisture absorption amount can be achieved.

With the embodiment described above, an example is shown of a case in which during the time until the air volume V of the regenerating fluid reaches the lower limit air volume VL, the control device 7 increases the air volume V of the regenerating fluid to follow the increase in the air volume of the conditioned air (see FIG. 5).

As shown in FIG. 9, without regard to the air volume of the air subject to dehumidification, the air volume V of the regenerating fluid may also be made to be held at a lower limit air volume VL by which the target moisture absorption amount of the air subject to dehumidification can be achieved (see FIG. 9, line segment d).

In this case, the air volume control for the sirocco fan 6B provided in the flow passage (second flow path 3) of the regenerating fluid is not necessary, so it is possible to replace the sirocco fan 6B with a less expansive, smaller fan. As a result, it is possible to reduce the production cost of the air conditioning device 1, 1A, 1B.

Also, by replacing the sirocco fan 6B with a smaller fan, it is possible to further suppress the capacity of the space needed for installing the air conditioning device 1, 1A, 1B.

As a result, while effectively utilizing the limited space in the vehicle V, it is possible to anticipate an improvement in the degree of freedom of installation of the air conditioning device 1, 1A, 1B.

The invention of present application is not limited to only the modes shown in the embodiments and modification example noted above, and it is possible to make suitable changes within the scope of the technical concept of the invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a vehicle unless otherwise indicated.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An air conditioning device for a vehicle comprising:
a first flow path through which air subject to dehumidification flows;
a second flow path through which air for recovery flows;
a desiccant part fluidly communicated with both the first flow path and the second flow path, and configured to adsorb moisture contained in the air subject to dehumidification to dehumidify the air subject to dehumidification, and to discharge the moisture to the air for recovery; and
a controller configured to control an air volume of the air subject to dehumidification in the first flow path and an air volume of the air for recovery in the second flow path to change correlation between the air volume of the air subject to dehumidification and the air volume of the air for recovery between before and after the air volume of the air for recovery reaches a prescribed air volume for achieving a target dehumidification amount of the air subject to dehumidification so that the air volume of the air for recovery after reaching the prescribed air volume is less than the air volume of the air for recovery corresponding to the air volume of the air subject to dehumidification before achieving the target dehumidification amount.

2. The air conditioning device for the vehicle according to claim 1, wherein
the controller is configured to maintain the air volume of the air for recovery at or above the prescribed air volume after the air volume of the air for recovery reaches the prescribed air volume.

3. The air conditioning device for the vehicle according to claim 1, wherein
the controller is configured to hold the air volume of the air for recovery at a constant value, after the air volume of the air for recovery reaches the prescribed air volume.

4. The air conditioning device for the vehicle according to claim 1, wherein
the first flow path is configured to be fluidly communicated with a temperature regulating unit so that air, for which the temperature has been regulated by the temperature regulating unit, flows in the first flow path, and
the second flow path is fluidly communicated with outside of the vehicle so that air taken in from outside of the vehicle flows in the second flow path.

5. The air conditioning device for the vehicle according to claim 1, further comprising
a temperature regulating unit configured to regulate a temperature of air, wherein
the first flow path is fluidly communicated with the temperature regulating unit so that the air, for which the temperature has been regulated by the temperature regulating unit, flows in the first flow path, and
the second flow path is fluidly communicated with outside of the vehicle so that air taken in from outside of the vehicle flows in the second flow path.

6. The air conditioning device for the vehicle according to claim 1, wherein
the desiccant part is provided in an intersection area in which the first flow path and the second flow path intersect.

7. The air conditioning device for the vehicle according to claim 1, wherein
the controller is configured to increase the air volume of the air for recovery with a prescribed correlation to an increase in the air volume of the air subject to dehumidification, before the air volume of the air for recovery reaches the prescribed air volume.

8. The air conditioning device for the vehicle according to claim 1, wherein
the controller is configured to set the prescribed air volume for achieving the target dehumidification amount of the air subject to dehumidification to 1.5 $m^3$/min.

* * * * *